Figure 1:
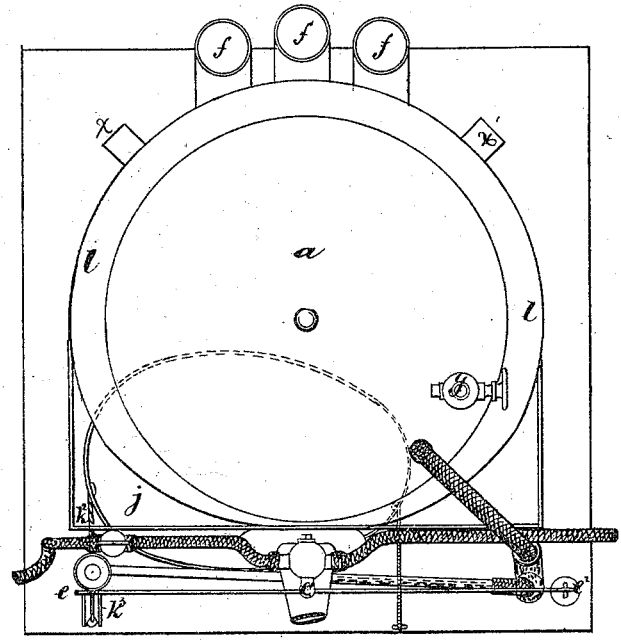

2 Sheets--Sheet 1.

H. BOYLE.
Heat Regulators.

No. 142,371. Patented September 2, 1873.

Witnesses. Inventor.
G. Mathis Henry Boyle
Solon C. Kemon per
Attorneys.

AM. PHOTO-LITHOGRAPHIC CO.N.Y. (OSBORNE'S PROCESS)

2 Sheets--Sheet 2.
H. BOYLE.
Heat Regulators.
No. 142,371.     *Fig. 4.*     Patented September 2, 1873.
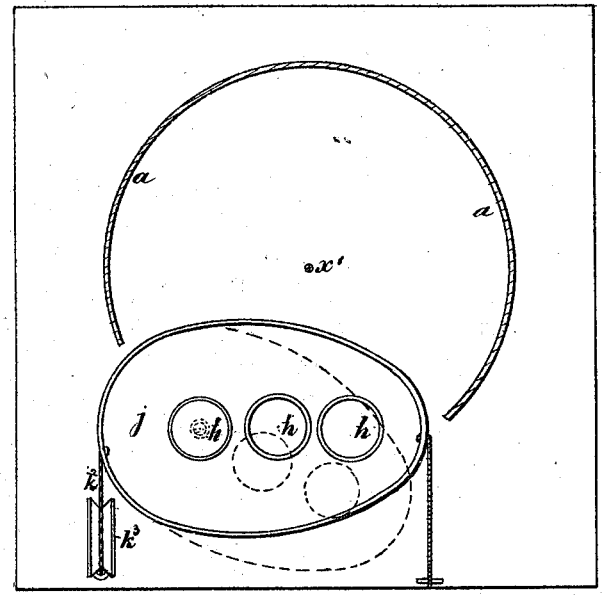
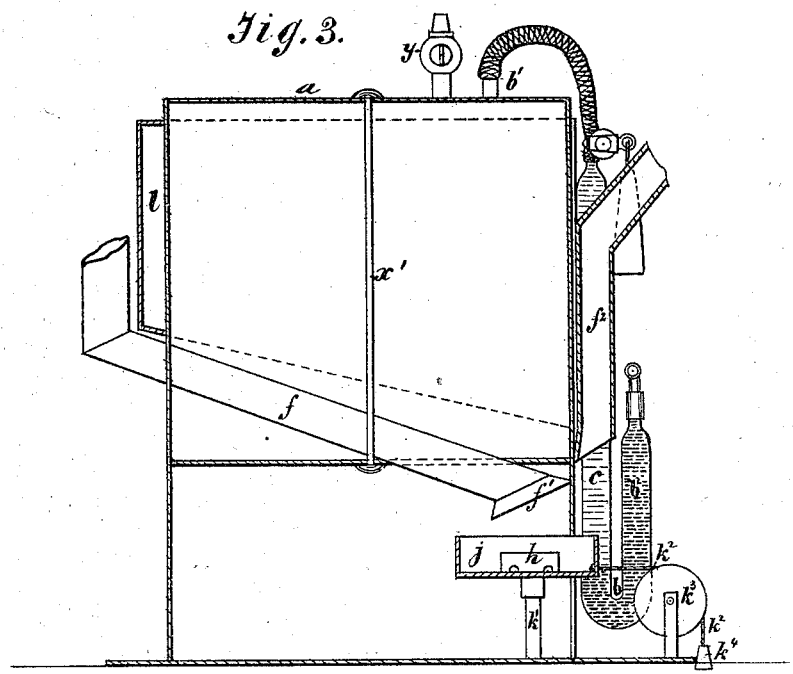
Witnesses:
G. Mathis.
Solon C. Kemon
Inventor:
Henry Boyle
Per
Attorneys.

UNITED STATES PATENT OFFICE.

HENRY BOYLE, OF LONDON, ENGLAND.

IMPROVEMENT IN HEAT-REGULATORS.

Specification forming part of Letters Patent No. 142,371, dated September 2, 1873; application filed May 5, 1873.

*To all whom it may concern:*

Be it known that I, HENRY BOYLE, of London, county of Middlesex, England, have invented a new and Improved Heat-Regulating Apparatus; and I do hereby declare the following to be a full, clear, and exact description of the same, reference being had to the accompanying drawing forming part of this specification.

My invention relates to improved self-acting apparatus for maintaining an equable temperature, chiefly applicable for the purposes of incubating, forcing, and such like. The regulator consists of a closed cylindrical vessel, filled with water, and wholly or partly surrounded by a jacket or casing, also filled with water, but having no communication with the vessel. In connection with the upper part of this vessel is an inverted siphon or U-shaped tube of glass, one leg being connected to the vessel, and the other and shorter leg terminating in a contracted neck, to which a long slender glass tube is connected by a flexible joint. This latter tube is disposed in a horizontal or nearly horizontal position, and is suspended at the other end from one end of a counterpoised arm or balance.

The vessel and tubes having been first filled with water, mercury is poured into the open end of the balanced tube, and, displacing the water, fills the shorter leg and so much of the slender tube as will cause the latter to balance the counterweighted arm when the water in the vessel is at the temperature it is desired to maintain. Heat is applied, either directly to the vessel, by which it is transmitted to the water in the jacket, or the jacket is heated, and the heat transmitted to the water in the vessel.

For incubating purposes, for plant-cases, and wherever the object to be heated is small, the first arrangement is preferred; and in the case of an incubator the water in the jacket circulates through a water-proof bag in connection therewith, and in contact with the eggs to be hatched. For hot-house and such like the jacket is preferably connected with the ordinary hot-water-circulating pipes, which are heated by the usual means, the heat being transmitted from the jacket to the regulator-vessel. For plant-cases the water, rising from the jacket, will circulate through a cage of pipes surrounding the plants, which would be placed in a pot received in a recess or chamber sunk in the top of the regulator-vessel.

The action of the regulator is as follows: The mercury in the one leg of the U-tube being supported therein and at a certain height in the balanced tube by the water in the closed vessel and the other leg, and the said tube being exactly balanced by the counterpoised arm when the desired temperature is attained, it follows that when any increase in a temperature takes place the mercury is caused to rise in the tube, which thereby overcomes the counterpoise, and sinks. This movement is caused to decrease or check the supply of heat by reducing the size or number of flames, when gas-jets or lamps are employed, or by closing a damper or dampers in other cases. The heat is again restored, when an opposite movement of the tube is produced by the falling of the mercury in the tube consequent on a decrease in the temperature of the water in the vessel.

By the use of water in the closed vessel I obtain nearly the same result as would be obtained by an equal quantity of mercury, as the expansion of the two by heat is almost the same, but at much less expense. I use mercury in the U-tube merely for the sake of its greater weight.

Figure 2:
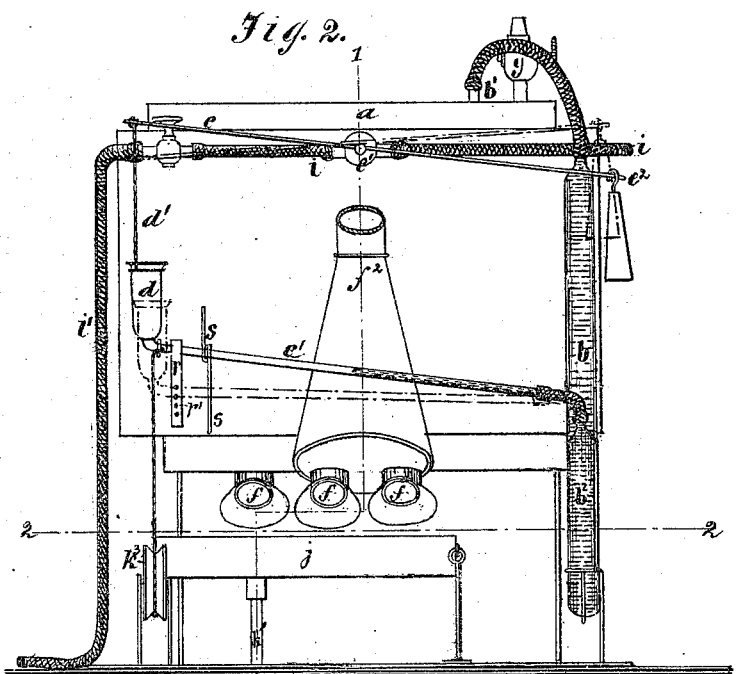

Figure 1 of the accompanying drawings shows a plan, and Fig. 2 a front elevation, of my improved heat-regulating apparatus, while Fig. 3 is a vertical section on line 1 1 1, Fig. 2. Fig. 4 shows a horizontal section on line 2 2, Fig. 2.

Similar letters of reference indicate corresponding parts.

The apparatus is here shown as applied for use in connection with an incubator. In this case, as it is important that the slightest rise in the temperature should be checked by an immediate reduction in the supply of heat, the latter is applied to the regulator-vessel itself, whence it is transmitted to the incubator proper.

$a$ is a closed cylindrical vessel filled with water. $b$ is the siphon-tube, connected at $b^1$ with the top of the vessel $a$ by a flexible but non-elastic tube, which may be of India rubber, bound round with some non-elastic material. To the other leg, $b^2$, is attached, by a piece of India-rubber tube, the long slender tube $c'$, which is bent upward at the other end, and terminates in the open bowl or funnel $d$. This end is suspended by a cord, $d'$, from one end of an arm, $e$, pivoted at $e^1$, and counterweighted at $e^2$ sufficiently to maintain tube $c'$ when filled to a certain height with mercury in a nearly horizontal position. The mercury is supported in the stem $c$ and leg $b^2$, owing to the incompressibility of the water in vessel $a$ and leg $b$. The vessel $a$ is traversed by flues or chimneys $f$, placed diagonally or otherwise, the open mouth $f^1$ of each of which is over an oil-lamp, $h$, Figs. 3 and 4. If gas be employed as the source of heat, one or more burners and chimneys may be used, and the heat may be regulated by making the pivot $e^1$ of arm $e$ a cock on a tube, $i$, to regulate the supply of gas passing through the tube $i'$, which leads to the burners. The gas-burners will, in such case, occupy the same position as the oil-lamps $h$, which are shown placed in a shallow oil-tray, $j$. The tray is mounted on a vertical pivot, $k^1$, situated, preferably, directly beneath one of the oil-lamps, so that when the tray is partly rotated, all the lamps but one may be withdrawn from beneath the vessel $a$. The tray is connected by a cord, $k^2$, passing round a pulley, $k^3$, with the extremity of tube $c'$. $k^4$ is a pendent weight, attached to the tray $j$ by a cord passing over pulley $k^3$, to swing said tray forward, as seen in dotted lines in Fig. 4. As soon as the tube $c$ sinks to the position shown in dotted lines, Fig. 2, the rising of the tube returns said tray to position. $l$ is the metal casing or jacket surrounding vessel $a$, and also filled with water, to which is connected a water-proof bag by flexible tubes attached to nozzles $x$, said bag being laid upon the eggs, which are disposed on suitable trays above vessel $a$. The water-proof bag and egg-trays are not shown in the drawings. $r$ is a loop, in which tube $c'$ moves. It serves as a stop to prevent said tube moving higher or lower than necessary. $r'$ $r'$ are holes for the insertion of a peg when gas is used, to prevent the tube falling so low as to put the gas quite out. The position of this peg must be adjusted as required, according to the pressure in the gas-supply pipe, which is generally liable to occasional variations. $s$ $s$ are small India-rubber springs attached above and below tube $c'$, for the purpose of rendering the rise and fall of said tube gradual, and preventing any sudden movements, which would cause equally sudden variations in the temperature. The whole apparatus is to be inclosed in a suitable non-conducting case, provided with openings for the flues or chimneys $f f$, and with a spare flue, $f^2$, outside of vessel $a$, for the heat of the lamps in tray $j$ to escape at when moved from under vessel $a$. Instead of heat being applied to vessel $a$, the jacket $l$ may be in connection with a system of hot-water-circulation pipes. In this case heat would be transmitted from the jacket to the vessel $a$, the heat of said jacket, and consequently of the circulation-pipes, being regulated, as before, by the rise and fall of the tube $c'$, which in this case would open or close certain dampers suitably arranged, the gas or lamp flames being, of course, not required.

This improved heat-regulating apparatus may also be applied to other purposes besides those above indicated—as, for instance, mushroom beds and chemical or medical baths; also, for regulating the passage of the heated air through the flues above sunlights. In the latter case the jacket would communicate with a coil of pipes placed in the flue, and the arm $c'$ would be connected to a suitable damper, (balanced so as to be easily moved,) which would be opened wider in proportion as the temperature of the current passing through the flue increases.

I employ a vessel of cylindrical form as being more capable of resisting the internal pressure exerted by the weight of the mercury on the water confined therein. The two ends of the vessel may be connected by a rod or stay, $x'$, to prevent bulging; $y$, cock for the escape of air when filling chamber $a$.

The advantages of the apparatus of my invention are that it is at once simple and efficient, automatic in its action, not easily put out of order, and can be cheaply made.

Having thus described my invention, what I claim as new, and desire to secure by Letters Patent, is—

1. The combination of the movable or pivoted tray for the lamps or burners with the automatic mercurial or heat regulator, substantially as shown and described, whereby said tray may be operated to vary the degree of heat transmitted to the regulating apparatus, as specified.

2. The fixed siphon-tube $b$ $b^1$ $b^2$, and connecting directly with vessel $a$, the vibrating tube $c$ connected therewith, the springs $s$, and guide and stop $r$, all combined and arranged as shown and described.

The above specification of my invention signed by me this 29th day of January, 1873.

HENRY BOYLE.

Witnesses:
  W. CLARK,
  WM. S. E. SWINNOCK.